(12) United States Patent
Robinett et al.

(10) Patent No.: US 7,323,849 B1
(45) Date of Patent: Jan. 29, 2008

(54) RECHARGEABLE PORTABLE LIGHT WITH MULTIPLE CHARGING SYSTEMS

(76) Inventors: Mark I. Robinett, 207 Terrace Ave., San Rafael, CA (US) 94901; Don Snyder, 3020 Browns Valley Rd., Napa, CA (US) 94558

( * ) Notice: Subject to any disclaimer, the term of this patent is extended or adjusted under 35 U.S.C. 154(b) by 99 days.

(21) Appl. No.: 10/970,767

(22) Filed: Oct. 22, 2004

(51) Int. Cl.
*H02J 7/00* (2006.01)

(52) U.S. Cl. .................................. 320/167; 315/86

(58) Field of Classification Search ................ 315/86, 315/200 A, 150, 152, 159; 362/183–185, 362/257, 800; 320/166–167
See application file for complete search history.

(56) References Cited

U.S. PATENT DOCUMENTS

| | | | |
|---|---|---|---|
| 4,384,317 A | 5/1983 | Stackpole | 362/183 |
| 5,211,470 A | 5/1993 | Frost et al. | 362/183 |
| 5,332,927 A * | 7/1994 | Paul et al. | 307/66 |
| 5,572,108 A | 11/1996 | Windes | 320/167 |
| 5,604,426 A | 2/1997 | Okamura et al. | 323/282 |
| 5,621,303 A | 4/1997 | Shalvi | 315/50 |
| 5,782,552 A * | 7/1998 | Green et al. | 362/183 |
| 5,783,928 A * | 7/1998 | Okamura | 320/167 |
| 5,818,132 A | 10/1998 | Konotchick | 310/17 |
| 5,975,714 A | 11/1999 | Vetorino et al. | 362/192 |
| 6,095,661 A | 8/2000 | Lebens et al. | 362/184 |
| 6,225,781 B1 * | 5/2001 | Okamura et al. | 320/166 |
| 6,404,170 B2 * | 6/2002 | Okamura et al. | 320/166 |
| 6,563,269 B2 * | 5/2003 | Robinett et al. | 315/86 |
| 6,950,320 B2 * | 9/2005 | Shin | 363/21.15 |
| 2003/0026092 A1 * | 2/2003 | Reese et al. | 362/183 |
| 2005/0219060 A1 * | 10/2005 | Curran et al. | 307/112 |
| 2006/0164826 A1 * | 7/2006 | Ackermann et al. | 362/157 |

\* cited by examiner

*Primary Examiner*—Douglas W. Owens
*Assistant Examiner*—Ephrem Alemu
(74) *Attorney, Agent, or Firm*—Dan Swayze

(57) ABSTRACT

A rechargeable portable light having a housing member with an opening for the emission of light, and two possible charging systems including an AC charger, and an auto or boat charger. An electronic circuit is located within the housing member and includes at least one super capacitor for power storage. The super capacitor is charged by a charging system. A charging system is presented that can charge two super capacitors in series, or more than two super capacitors in series. A power inverter circuit with a high efficiency (approximately 90% to 95% efficiency) is used to regulate voltage and current from one super capacitor or two or more super capacitors in series to a light emitting diode. This circuit includes at least one light emitting diode (LED) positioned near the opening in the housing member, and a switch interposed between the capacitor and the output circuit. The switch is closed when power is delivered from the super capacitor to the LED.

6 Claims, 5 Drawing Sheets

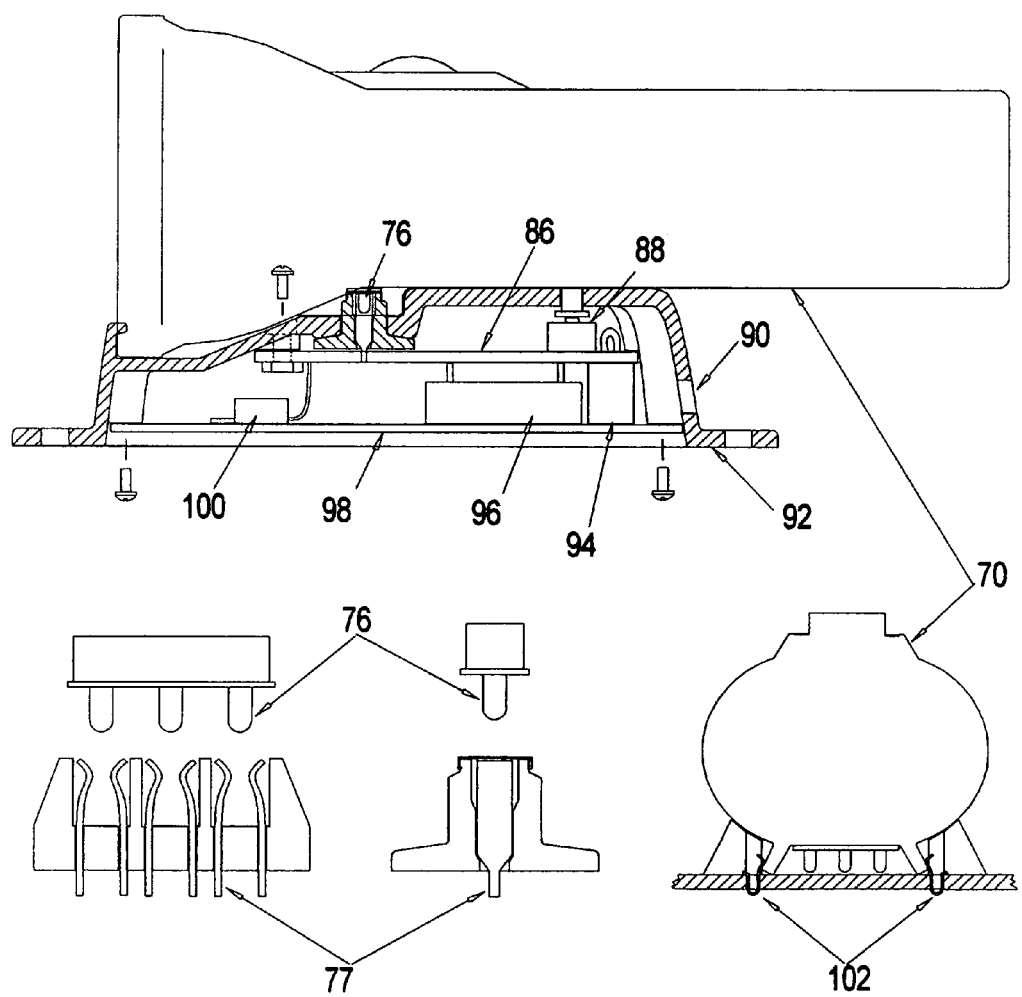

RECHARGEABLE PORTABLE LIGHT WITH MULTIPLE CHARGING SYSTEMS

CROSS REFERENCE TO RELATED APPLICATIONS

This application claims reference to U.S. Pat. No. 6,563,269, filed Dec. 6, 2000 by the inventors of the present application.

BACKGROUND OF THE INVENTION

1. Field of the Invention

The field of this invention relates to flashlights and other portable lighting devices, which are used in the home (inside and outside), in automobiles, for personal safety and emergency uses, for camping and recreation, for construction, for law enforcement uses, etc. More specifically, this invention relates to flashlights and other portable lights that have a charging mechanism and a power storing mechanism, wherein there is no need for batteries.

2. Discussion of Related Art

Ordinary flashlights and portable lights have been in use for many years throughout the world. The most popular kinds of flashlights and portable lights use disposable batteries and replaceable light bulbs. There are also a number of portable lights available today that contain rechargeable batteries, typically used in connection with home recharging units in which plugging the light into an ordinary home electrical outlet will charge the batteries. However, eventually these kinds of portable lights need new batteries, as the rechargeable batteries become depleted and incapable of holding a charge after extensive use.

There would be many advantages in having a portable light that never needs a change of batteries, never needs a bulb replacement, and can be very quickly charged from a power source. The applications for such a light include inside and outside home use, automobiles emergency use, camping, bicycling, general emergency use, construction and law enforcement uses, and numerous uses in underdeveloped countries. Such a light would also represent an economic and ecological advantage in reversing the environmental impact of discarded batteries, such as nickel-cadmium batteries; the most commonly used, highly toxic, rechargeable battery.

The most popular flashlights and portable lights used in the world today are described in U.S. Pat. Nos. 4,032,773, U.S. Pat. No. 4,041,304, U.S. Pat. No. 4,151,583 and closely related prior art. These flashlights have one or more disposable batteries, a single on/off switch, and a light bulb backed by a reflective cone and covered with a glass or plastic lens. The major problem with these types of flashlights is that the battery charge decays with use and the batteries must be replaced regularly. This is costly, inconvenient, and has a negative environmental impact. In addition, the bulbs burn out and require replacement costs and wasted time in locating new bulbs.

Rechargeable flashlights and portable lights have been described in several United States patents, including: U.S. Pat. No. 3,787,678; U.S. Pat. No. 3,829,676; U.S. Pat. No. 4,045,663; U.S. Pat. No. 4,819,139; U.S. Pat. No. 4,794,315; U.S. Pat. No. 4,325,107; and U.S. Pat. No. 4,357,648. The portable lights disclosed in these patents have rechargeable batteries that last many times longer than the typical disposable batteries in typical flashlights. However, the principal problem with rechargeable battery flashlights is that the rechargeable batteries wear out and must be replaced, and these batteries, which are often nickel-cadmium batteries, pose dangerous problems to the environment if not disposed of properly. Another problem with this type of portable light is that recharging requires a lengthy amount of time.

Other portable lights using solar cells for charging the batteries have been described in U.S. Pat. No. 5,621,303, and EP 5,3143,8A1. The devices disclosed therein use rechargeable batteries that wear out and require replacement.

A portable light with a hand-crank generator has been described in U.S. Pat. No. 4,360,860. This light also has the problem of the rechargeable battery needing replacement at some time.

U.S. Pat. No. 5,782,552 describes a light used for highway signaling purposes, which employs a solar panel for charging, a capacitor for electrical storage and a blinking LED for the signal light. This patent describes a specific circuit for charging the capacitor when light is available and automatically energizing the blinking LED when ambient light is below a pre-determined level, and a means to stop energizing the LED when the ambient light is above a pre-determined level. This art does not describe the use of a bright-white LED (non blinking), which is used in the present invention for the source of light. In addition, the '552 patent makes no reference and provides no means of using the system for flashlights, portable lighting for home, recreation, automobile or emergency uses.

U.S. Pat. No. 5,975,714 describes a rechargeable flashlight using a capacitor for energy storage, an LED for light, and a linear motion generator to generate the power that is stored in the capacitor. This portable light has several problems. First, it uses a small Farad super capacitor, (1 Farad), which holds enough power for only about 5 minutes of light. Secondly, this portable light provides no other means, other than the shaking, to charge the capacitor. One final problem with the '714 is that the light intensity fades quickly; it starts out at full brightness, within two to three minutes it is at approximately half brightness, and it continues to fade.

SUMMARY OF THE INVENTION

Most portable power sources are battery in nature, which provides a fairly consistent voltage source to most kinds of loads. As flashlights have switched to LED lamps rather than incandescent, new problems have complicated the change. The LED's are current driven and do not operate well with a voltage source. Some manufactures have provided special regulator circuits to match the LED input requirements. Others have just found batteries that would work with just a resistor or just the battery resistance itself. This invention takes a departure from batteries and uses a new source of power that is stored in very high value super capacitors. Unlike batteries, there is no nominal voltage, with the voltage varying as $V=Q/C$. They can be charged at a much faster rate and last much longer than batteries which makes them attractive as a power storage device. The fact that the voltage on the capacitor will go from its full charge value down to near zero point makes it impossible to transfer its energy by conventional means. The intent of this invention is to show a method to transfer the energy efficiently out of a capacitor or group of capacitors to a load that is current driven.

The flashlight and portable light of the present invention improves upon our previous design disclosed in U.S. Pat. No. 6,563,269, which is incorporated herein by this reference in its entirety, and which will be hereinafter referred to as the '269 patent. The present design overcomes the battery replacement and disposal problems associated with known art by using a super capacitor for storage of electricity rather than any type of battery. As a result battery replacement is entirely obviated. The super capacitor used in this invention can be recharged and discharged over 500,000 times without noticeably affecting its ability to hold a full electrical charge. In addition, if disposal of a super capacitor is ever necessary, it poses no environmental hazard as it is made of environmentally friendly activated charcoal.

The present invention overcomes electrical charging problems associated with much of the prior art by using an exterior solar panel to charge the storage capacitor as was shown in our '269 patent. When sufficient light is available, the solar panel generates electricity that is then stored by the capacitor. Two additional charging options are provided in the present invention, including a home charger unit, and a car charger unit. The home charger and the car charger can charge the capacitor in this invention fully in 30 seconds to 2 minutes depending on the size of the super capacitor used. The size of super capacitor presented in this application uses two 200 Farad super capacitors wired in series for a total of 400 Farads. Smaller or larger sizes of super capacitors can be used. The AC charger we present in the present invention charges the 400 farad super capacitor series design in 2 minutes. By using the higher voltage of the capacitors in series, we decrease the charge time by one half without needing to increase the amperage—this amounts to a more efficient and less expensive electrical circuit. However, a more powerful charger is possible that will charge the capacitors faster by increasing the amperage input of our present charge circuit.

The AC home or the car charger unit can be completely external to the portable light or incorporated into the body of the portable light so that either an AC plug or a cigarette lighter plug can extend from the unit for connection to either outlet.

The present invention overcomes the bulb replacement problem by using a high brightness white high-power LED (light emitting diode). The LED used in this invention is rated to last for up to 100,000 hours in continuous use. This means that the light source (in this instance the LED) would, for all practical purposes, never need replacement. The LED uses less power than the typical incandescent bulbs used in most conventional flashlights because less energy is lost in the form of heat (incandescent bulbs waste large amounts of power to heat); thus a super capacitor becomes feasible for energy storage because an LED requires less power. By using a high brightness LED that provides continuous light, the present invention also overcomes the problem associated with the device disclosed in the '552 patent that employs a colored and blinking LED. This single LED also overcomes the problem associated with using multiple LEDs by allowing the use of a single optic to provide a focused beam of light, or by using this single LED in a side-emitter form and using a reflector to provide a focused beam of light. Multiple LEDs cannot be focused into a single concentrated beam of light with either an optic or a reflector.

U.S. Pat. No. 6,563,269, by the present inventors disclosed circuitry for high brightness LEDs that are designed to operate at about 25 to 60 milliamps, and about 3.5 volts. The LED used in the present invention is a higher output white LED; it operates as high as 350 milliamps and at 3.4 volts. This higher output, 1 Watt LED produces approximately 10-15 times the light of the 25 mAmp LEDs. The circuitry presented in this invention shows the details for the higher power output to this more powerful LED and the new charging circuit for a larger super capacitor storage system. The circuitry presented in this invention can also be used, with slight modification, with higher output LEDs such as a 3 watt LED now available.

By using a circuit specifically developed for the present invention which produces a constant current source to the LED for a constant intensity of light during the cycle of power use from the super capacitor, the present invention solves the prior art problem of light brightness decay as voltage from the capacitor drops off. In addition, in an alternative embodiment, the present invention provides a means to increase or decrease brightness of the portable light by using a two or more position switch to increase or decrease the current output to the LED. This feature allows the portable light of the present invention to provide light for a long period of time when using one LED as the light source, or to provide a much brighter light when it is needed, albeit for a shorter period of time. The 1 Watt LED used in the present invention will run as low as 10 mAmps or as high as 350 mAmps allowing a great range of light intensity choices and light burn time choices. The output circuit of the present invention has an efficiency of approximately 90% to 95%. This solves the problem of needing a circuit that is very efficient because of the limited energy storage capacity of super capacitors, to conserve as much of the energy as possible for light output brightness and duration.

In one configuration of this invention, when a switch is turned on, power stored in the super capacitor travels to an inverter circuit which produces the correct voltage for the LED, and which produces the correct current for the LED and slowly tapers off as the capacitor voltage drops. This circuit operates over a full range of voltages from 6 volts DC to 0.8 volts DC (in this case there are two 2.7 volt super capacitors wired in series which can be charged up to almost 6 volts).

The present invention uses a new design with the super capacitors compared to the design in our '269 patent. In the present invention, two super capacitors are wired in series to double the voltage. A charging system is presented which charges the super capacitors in series by keeping their voltages balanced to prevent damaging them during the charging cycle. Using the super capacitors in series solves 3 problems. The first problem it solves is to make the output circuit more efficient by providing a higher voltage to the output circuit. As numerous prior art has demonstrated, circuits become less efficient as the voltage goes lower. The second problem this solves is that it allows for a greater percentage of the stored power in the super capacitors to be used during each charge cycle. For example, when super capacitors are used in parallel, our present circuit can only pull them down to about 0.8 volts. When the capacitors are wired in series, the present invention's circuit can pull each individual capacitor down to about 0.4 volts which means that more of the stored energy from each capacitor is being used in each charge/discharge cycle. The third problem this improvement solves is that it provides for a shorter time to charge the super capacitors without the expense of using a higher amperage charging system. With the super capacitors wired in series, they can be charged at double their normal voltage, which reduces the charge time to half for any given set amperage of charging power. The charging circuitry to do this is presented in this invention.

Means are provided in the present invention to charge this portable light with a portable charger plugged into a home outlet, and a portable charger plugged into a cigarette lighter in an automobile. With both of these chargers, the actual charging of the storage capacitor is very fast depending on the current output of the charger. Charging of a 100 Farad capacitor using a 10 Amp current to 2.7 V, DC (provided by a home charger or a car charger) will charge the super capacitor in approximately 30 seconds. A capacitor charges quickly because there is very little restriction in its ability to take on a charge. The charge circuit presented in the present invention charges a 400-farad super capacitor (two 200 F capacitors wired in series) in 2 minutes. However, even faster chargers can be made by increasing the amperage of the charge circuit. This fast charging represents a substantial advantage over conventional rechargeable flashlights, which typically take 2-3 hours or more to charge fully.

The combination of a solar panel as shown in our '269 patent, optional home and car chargers (or a crank-generator as shown in '269) a super capacitor for electricity storage, and a high brightness, high power white LED for light produces a portable light that can hold enough electricity for one, two or more hours of very bright light before needing to be recharged. Super capacitors of 100 farads and more are now available at economical costs for use in flashlights and other portable lights. Larger storage capacities are accomplished by adding additional capacitors, or by using larger super capacitors, which are available now. The super capacitors of the present invention are small enough in size to be used in very portable lights (a typical 100 F at 2.7 Volts is the size of a C-cell battery, and lighter in weight). Our testing showed that when a 100 F capacitor is charged fully, it looses about 23% of its useable power after 6 weeks, and about only about 30% of its useable power after 3 months. This indicates that these super capacitors store power as well as typical nickel cadmium rechargeable batteries.

The preferred embodiment of this invention uses a new improved circuit to convert the energy stored in the super capacitor to a current source for the LED. Because this circuit is able to operate down to a voltage input of 0.8 V DC, single or multiple dry cell 1.5 V batteries can also be used to drive this circuit and the LED. Therefore, the present invention can easily incorporate the means to use a single battery, or two, three, or four 1.5 V batteries in series.

The present invention is also proposed for use in five additional lighting applications: In use as an outdoor landscaping light, an outdoor light, as a bicycle light (front or rear), as a portable reading light, and as a portable indoor building light. This invention can also be used in underwater applications for lighting because the light can be sealed, and it could be permanently sealed because it never needs to be taken apart because of the long life of the components.

In summary, the present invention solves several problems of the prior art devices, including: (1) battery replacement and disposal problems (for both rechargeable and non-rechargeable batteries); (2) charging speed problems; (3) the limitations of high power use and the replacement problem of incandescent bulbs; (4) the limitation of colored and/or blinking LEDs; (5) energy conservation due to the lack of options in selectively providing a very bright light or less bright light to conserve stored power; (6) the problem of brightness decay when power from a super capacitor is used to run a LED and (7) the problem when using an LED for light of a bright enough beam that is both bright enough and focusable into a single spot of light, or into a wider beam. In addition, the present invention improves upon the improvements of the '269 patent in improving the charging speed time, improving the output circuit efficiency (to approximately 95% efficient), and improving the amount of used power in each discharge cycle. Also, the present invention improves upon our prior application by using a higher output single LED and higher storage super capacitor assembly. In addition, we improve upon the '269 patent by using a higher power LED side emitting LED that is used with a reflector to obtain a concentrated beam of light. This type of concentrated beam is not possible when using multiple single LEDs common in the multiple LED flashlights of today.

The present invention generally comprises a housing suitable to its particular application, a charging system (a solar panel, a home charger unit, a car charger unit), a storage system that will last, in most instances, longer than a typical human lifetime, an electronic assembly for delivering current from the storage system to an LED, and an LED that will never need replacement in ordinary use. A solar panel can be positioned on the housing exterior. In addition, the present invention provides the means for quick charging from home AC or auto power sources. The present invention describes a truly portable light that can be quickly charged from external power sources, will never need a battery replacement, and will never need a LED (or a light bulb) replacement.

BRIEF DESCRIPTION OF THE DRAWINGS

FIG. 5 shows a cross-section view of the flashlight charger.

DETAILED DESCRIPTION OF THE DRAWINGS

Figure 1:
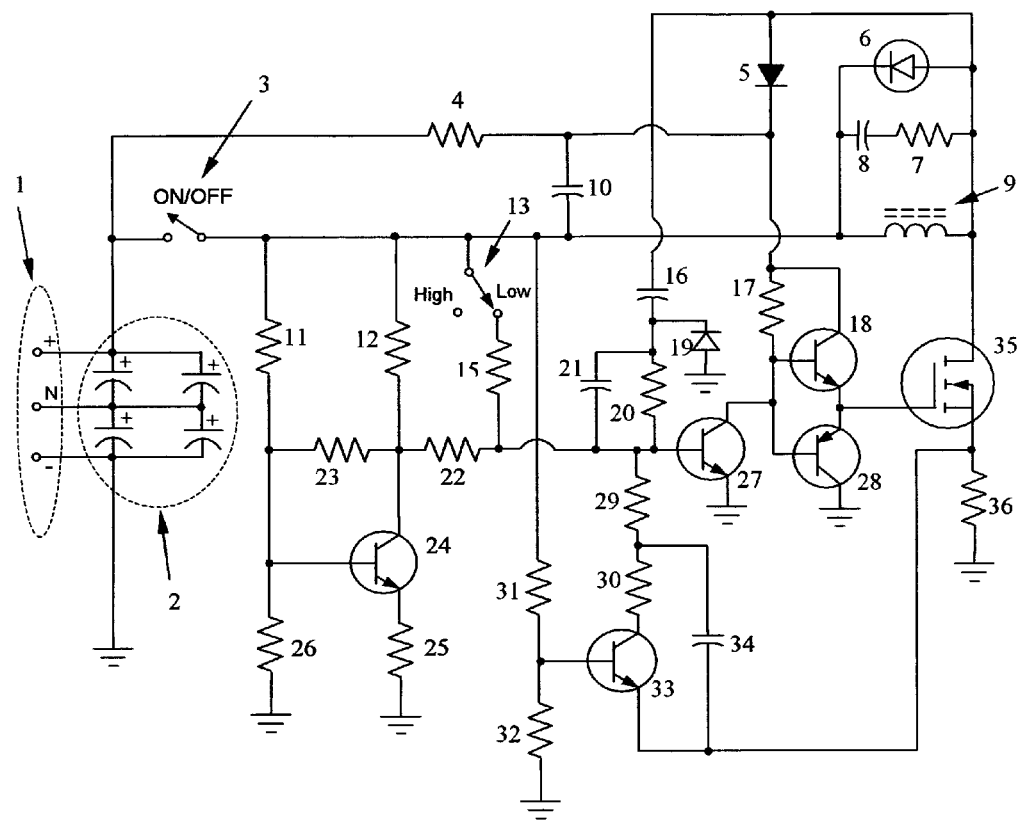
FIG. 1 is schematic diagram of the super capacitor to LED inverter circuit consisting of an inverter circuit to convert the energy from the storage super capacitors to the high power LED.

FIG. 1 is a schematic diagram of the rechargeable portable light's output circuit of the present invention. This view shows that in a first preferred embodiment, the light circuitry includes a super capacitor 2 to LED 6 inverter circuit. This power supply circuit drives a high power, one-Watt LED 6 from a very low voltage of less than one volt to a voltage of six volts or more. This enables a fast rechargeable flashlight to use super capacitors for power storage. The circuit shown in FIG. 1 has two important features. The output switching transistor is a high current FET 35, and the LED load 6 is across the inductor 9. The FET 35 has a much lower saturation voltage than a regular power transistor, but needs a gate voltage much greater than one volt to operate. To achieve this voltage the capacitor 10 stores the input voltage when the supply is off and when the supply is switched on, a voltage doubler is in effect to produce a high enough gate voltage to start the circuit. Diode 5 then takes over to maintain a high voltage supply for the gate circuit. Normally a switching supply uses a diode to transfer power to the output, but since the LED 6 is a diode, it can be placed directly across the inductor 9 to increase the efficiency of the circuit. The LED 6 does not draw power when reversed biased as the inductor is charging. Transistors 27, 18 and 28 form a push-pull driver for the FET. The purpose is to overcome the large capacitance developed at the FET gate switching point. Positive feedback for oscillation occurs through capacitor 16, 21 and resistor 20. Diode 19 maintains a positive signal current to transistor 27. Transistor 33 with resistors 29, 30 and capacitor 34 provide the peak current turnoff point by turning off transistor 27. This point is controlled to a minor degree by transistor 24 with resistors 11, 12, 23, 26, 25, and 22. This allows a controlled output curve over the input voltage range. In the present embodiment the circuit uses two super capacitors 2 or two pairs of super capacitors 2 in series as the power input. One super capacitor 2 can also be used with this circuit. This circuit will also be applicable for higher voltage super capacitors when they are produced at economical prices. The output LED 6 is a one watt, and white color for flashlight applications. The circuit can be used for other applications because the LED current can be easily controlled to a specified curve over the voltage input range.

Figure 2:
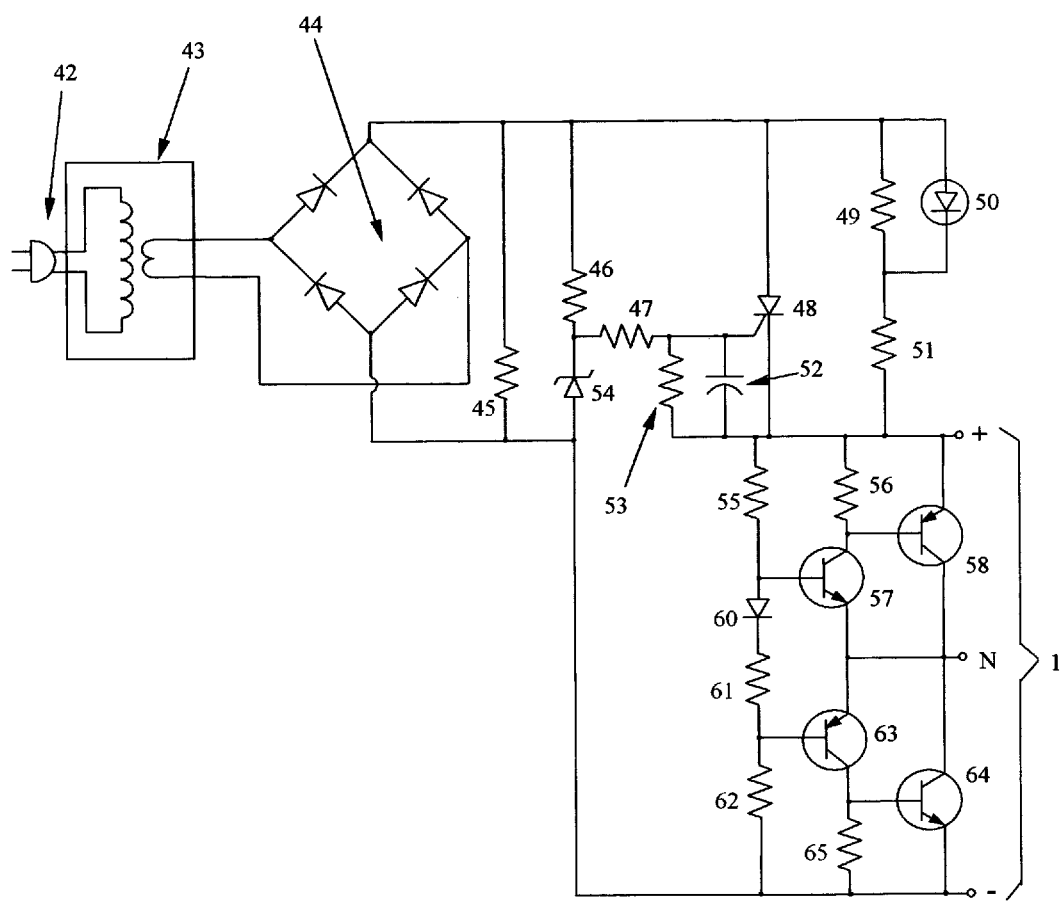
FIG. 2 is a schematic diagram of the super capacitor charger for series super capacitors consisting of an AC transformer, a bridge rectifier and an output circuit to provide a 3 wire charging system for super capacitors in series for balanced charging and with a voltage limit.

FIG. 2 is a schematic diagram of the electrical charging circuit for the present invention. A wall transformer 43 provides 8 volt AC input to a bridge rectifier 44, which changes the current to pulsed DC. A circuit is presented that provides a 3-line output to the super capacitor series configuration (shown in FIG. 1), which maintains the charge balance to each super capacitor. Charge contacts for the super capacitors are shown as 1. To prevent over charging the capacitors, a circuit consisting of a zener diode 54 and an SCR 48 is provided. The SCR 48 is allowed to be triggered at each pulse until the voltage across the capacitors reach near the zener 54 voltage. At that time the zener 54 prevents the SCR 48 from being triggered on and the higher voltage across the SCR 48 now lights the green indicator 50 to show the user the charge is complete. Resistance in the transformer 43 and long leads determine the peak current limit and is such to prevent over heating the components.

Figure 3:
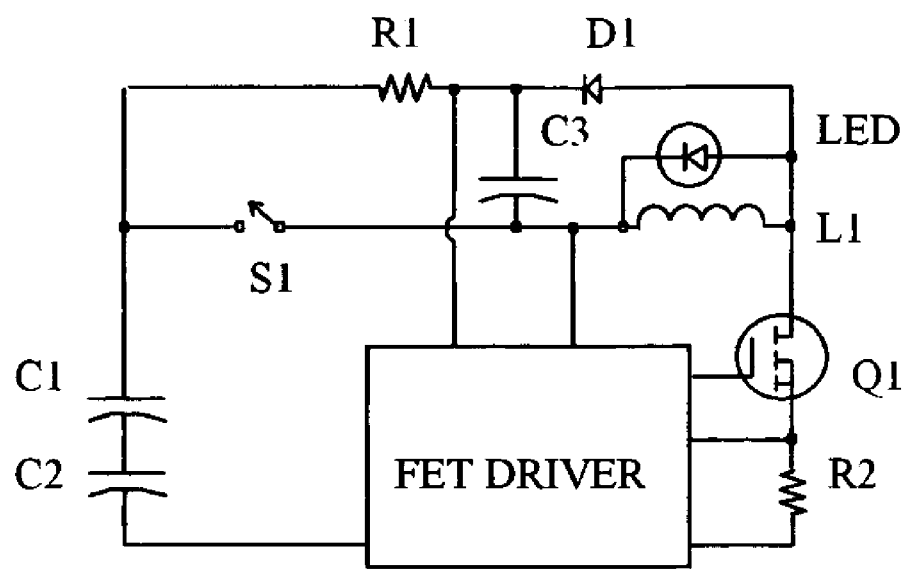
FIG. 3 is a simplified schematic of the super capacitor to LED inverter circuit (described in FIG. 1) to explain its theory.

FIG. 3 This method assumes a capacitor C1 or group of capacitors C1 and C2 is used as the energy storage device. It is also assumes the load is a current driven device such as an LED. For the purpose of illustration, it is assumed the capacitors C1 and C2 are in series to produce a more desirable voltage even though they could be in multiple series or multiple parallel. Also for the purpose of illustration, it is assumed the switching device is a FET, even though it could be a different kind of solid state device. Most power switching devices are now FET type rather than bipolar transistors. It takes less drive and provides higher efficiency. Not like a transistor, the FET needs a minimum gate voltage to operate. The net voltage of the super capacitor supply, C1, C2, can diminish to a value below this minimum voltage and prevents operation. Thus some of the energy in the capacitors can never be used. The technology of the super capacitor further complicates matters because of the maximum voltage allowed and thus reduces the range of voltage the capacitors may discharge. The method of this invention to extract as much of the stored energy as practical by having the circuit operate down to a very low voltage level. In this invention, a capacitor C3 is charged through a resistor R1 when the light circuit is turned off by means of S1. When switched on, the voltage of C3 is moved above the supply voltage. The FET DRIVER is then supplied a higher voltage of C3 plus the super capacitor supplies C1 and C2 for operation. The voltage of C3 is increased further by a continued charge through diode D1 during operation. The supply voltage of the super capacitors varies and can be either above or below the operating voltage of the LED so the LED drive circuit must then be independent of the voltage input. This invention accomplishes this by having the inductor L1 release its energy directly into the LED load. The supply need not be at a particular voltage because the circuit monitors the inductor current only. The FET switch Q1 places the inductor L1 across the supply to charge to a current monitored by R2. The FET Q1 is switched off when the current reaches a preset limit. The current in the inductor L1 is then released to the LED for a period of time before the circuit resumes to the start of a new cycle.

Figure 4:
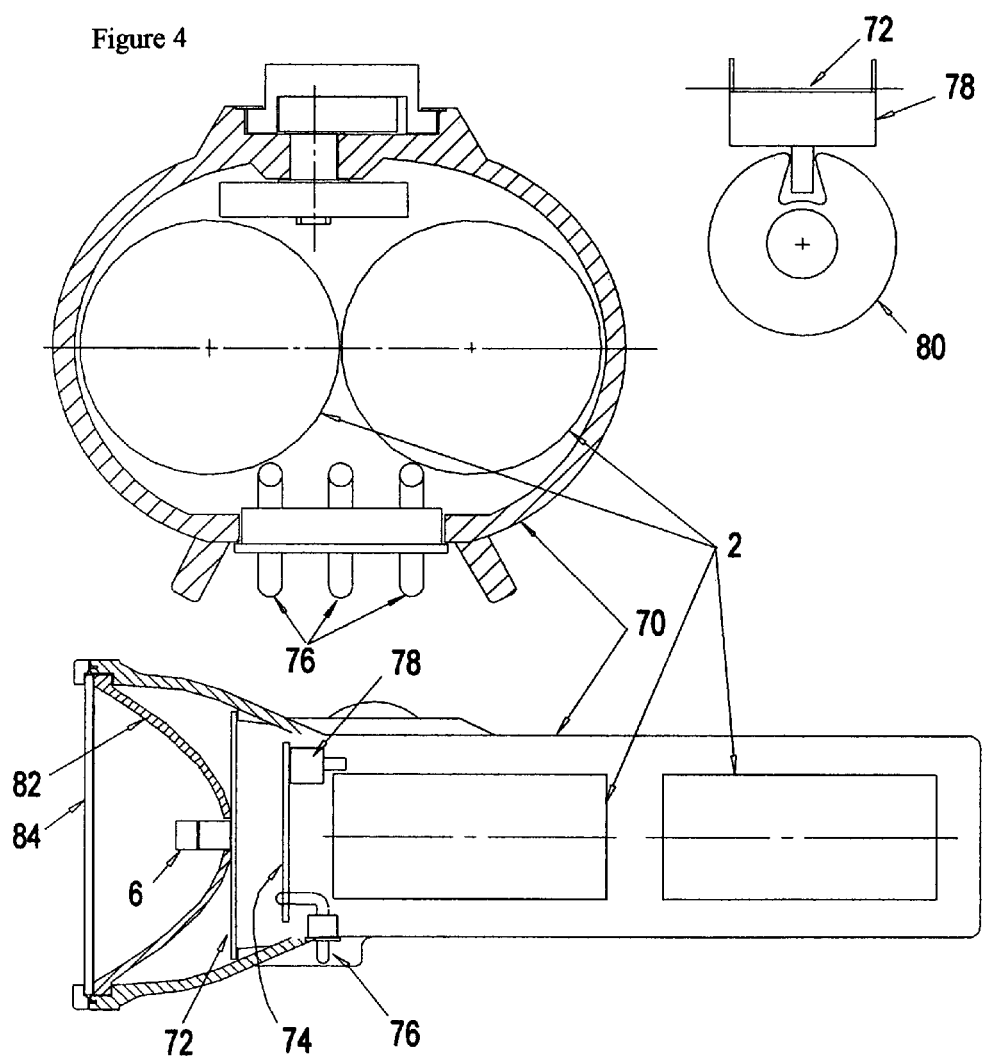
FIG. 4 shows a side elevation view and cross-section view of the present invention shown embodied as a flashlight.

FIG. 4 shows the present invention embodied as a flashlight. FIG. 4 first shows a cross-sectional view of the body of the flashlight showing the super capacitors 2, and the charging pins 76. Shown to the right of this view is a drawing of the switch mechanism 72, 78 and 80. FIG. 4 also shows a cross sectional side elevation view showing the interior of the flashlight including the reflector 82, LED 6, lens cover 84, LED heat sink 72, circuit board 74, charging pin 76, internal switch 78, and super capacitors 2.

FIG. 5 shows a cross-section view of the flashlight charger. Charge pin 76 plugs into charge receptacles 77. Charging activator switch 88 turns on when the flashlight is pressed into the charger base, and locking clips 102 hold the flashlight securely to the charge base during charging; 86 is the circuit board and rectifier 96 is attached to a heat sink 98, and plastic support 94 supports the circuit board. The power cord from an AC 120 volt source enters the charge base at 90, and 100 is the SCR.

What is claimed is:

1. A method for charging a plurality of super capacitors wired in series and using their stored power to drive a light emitting diode light source comprising:
    (a) providing a power source for input power;
    (b) providing a transformer and rectifier, or an inverter circuit for providing the correct voltage and amperage to an electronic charging circuit;
    (c) connecting an electronic charging circuit with a 3-line output to provide power for and control of electronic power to said plurality of super capacitors wired directly in series so that said super capacitors are charged and the charge is kept equally balanced in each said super capacitor;
    (d) providing an electronic output circuit to provide power for and control of power to a light emitting diode;
    (e) transferring power from said plurality of super capacitors wired directly in series to said output circuit; and
    (f) transferring power from said output circuit to said light emitting diode.

2. A rechargeable light comprising:
    a housing member having an opening for the emission of light; two super capacitors wired in series mounted within said housing; at least one light emitting diode; a 3-line voltage stabilizing charging circuit connected to the two super capacitors wired directly in series for charging said two super capacitors wired in series; and an output FET inverter circuit connected to said two super capacitors wired directly in series, for providing power for and control of said at least one light emitting diode.

3. A rechargeable light according to claim 2 wherein said LED is thermally attached to said housing member for heat dissipation.

4. A rechargeable light according to claim 2, wherein said 3-line voltage stabilizing charging circuit further comprises:
    a power source providing input power of 12 volts DC, or 120 volts AC, or 240 volts AC; and a circuit for providing the correct voltage and amperage from said power source to said charging circuit.

5. A rechargeable light according to claim 4, wherein said circuit for providing the correct voltage and amperage comprises:
    an inverter circuit for lowering said input power from a 12 volt DC source to said charging circuit.

6. A rechargeable light according to claim 4, wherein said circuit for providing the correct voltage and amperage comprises:
    a transformer for stepping down said input power; a rectifier for converting AC to DC from said input power to said charge circuit.

* * * * *